United States Patent
Yoon et al.

(10) Patent No.: US 7,983,989 B2
(45) Date of Patent: Jul. 19, 2011

(54) METHOD AND APPARATUS FOR IMPORTING CONTENT

(75) Inventors: Young-sun Yoon, Suwon-si (KR); Bong-seon Kim, Seongnam-si (KR); Su-hyun Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/522,437

(22) Filed: Sep. 18, 2006

(65) Prior Publication Data

US 2007/0156599 A1 Jul. 5, 2007

Related U.S. Application Data

(60) Provisional application No. 60/755,096, filed on Jan. 3, 2006.

(30) Foreign Application Priority Data

Mar. 8, 2006 (KR) .................. 10-2006-0021838

(51) Int. Cl.
*G06F 21/00* (2006.01)
(52) U.S. Cl. .............. 705/59; 705/52; 705/51; 705/50
(58) Field of Classification Search .............. 705/59, 705/50, 51, 52
See application file for complete search history.

(56) References Cited

U.S. PATENT DOCUMENTS

| | | | |
|---|---|---|---|
| 6,775,655 B1 | 8/2004 | Peinado et al. | |
| 6,816,596 B1 | 11/2004 | Peinado et al. | |
| 6,847,950 B1 | 1/2005 | Kamibayashi et al. | |
| 6,950,941 B1 * | 9/2005 | Lee et al. | 713/193 |
| 7,568,234 B2 * | 7/2009 | Naslund et al. | 726/26 |
| 2002/0073177 A1 | 6/2002 | Clark et al. | |
| 2002/0078178 A1 | 6/2002 | Senoh | |
| 2003/0016829 A1 | 1/2003 | Chu | |
| 2003/0028622 A1 | 2/2003 | Inoue et al. | |
| 2005/0071663 A1 | 3/2005 | Medvinsky et al. | |
| 2005/0102513 A1 * | 5/2005 | Alve | 713/168 |
| 2005/0182727 A1 | 8/2005 | Robert et al. | |
| 2006/0015502 A1 * | 1/2006 | Szucs | 707/9 |
| 2006/0075424 A1 | 4/2006 | Talstra et al. | |
| 2006/0117391 A1 * | 6/2006 | Kim | 726/27 |

(Continued)

FOREIGN PATENT DOCUMENTS

CN 1392700 A 1/2003

(Continued)

OTHER PUBLICATIONS

Preliminary Notice of the First Office Action issued May 18, 2010 in counterpart Taiwanese Application No. 095146589.

(Continued)

*Primary Examiner* — Pierre E Elisca
(74) *Attorney, Agent, or Firm* — Sughrue Mion, PLLC (57) ABSTRACT

A method and apparatus for protecting digital content in a digital rights management (DRM) system are provided. The method includes: determining a usage rule for content included in a first content file based on usage constraint information included in the first content file; and generating a second content file complying with this usage rule. According to the method and apparatus, the security requirement of content creators and content providers can be satisfied and at the same time the requirement of content consumers for freer usage can be satisfied.

8 Claims, 6 Drawing Sheets

U.S. PATENT DOCUMENTS

| | | | |
|---|---|---|---|
| 2006/0159423 A1* | 7/2006 | Zhang et al. | 386/94 |
| 2007/0156603 A1 | 7/2007 | Yoon et al. | |
| 2009/0180617 A1* | 7/2009 | Peterka | 380/277 |
| 2010/0217976 A1 | 8/2010 | Ju et al. | |

FOREIGN PATENT DOCUMENTS

| | | |
|---|---|---|
| CN | 1658554 A | 8/2005 |
| EP | 1 426 890 A1 | 6/2004 |
| EP | 2 009 567 A1 | 12/2008 |
| JP | 2006-520946 A | 9/2006 |
| KR | 2002-0019806 A | 3/2002 |
| KR | 10-2002-0064672 A | 8/2002 |
| KR | 2003-0006817 A | 1/2003 |
| KR | 10-2003-0047559 A | 6/2003 |
| KR | 10-2004-0028086 A | 4/2004 |
| KR | 10-2004-0029404 A | 4/2004 |
| KR | 10-2004-0030454 A | 4/2004 |
| KR | 10-2004-0070886 A | 8/2004 |
| KR | 10-2005-0120579 A | 12/2005 |
| KR | 10-2006-0115550 A | 11/2006 |
| KR | 10-2007-0073550 A | 7/2007 |
| KR | 10-2007-0073553 A | 7/2007 |
| TW | 200506828 A | 2/2005 |
| WO | 2005055022 A1 | 6/2005 |

OTHER PUBLICATIONS

Matsushita Electric Industrial Co., Ltd, "NetDRM Technology: Response to DVB Call for Proposals for Content Protection & Copy Management Technologies" Oct. 19, 2001, p. 1-44.

DVB Digital Video Broadcasting, "Digital Video Broadcasting (DVB); Content Protection & Copy Management" vol. A094, Nov. 1, 2005, 103 pages.

DVB Organization, "TMM-CPT1201: Comments on updated NDS proposal for SAC and Trust Establishment" Nov. 22, 2005, 5 pages.

Thomson Multimedia, "SmartRight Contribution to Rights Management & Protection Specifications" May 22, 2002, Version 1.0, 30 pages.

Matsushita Electric Industrial Co., et al, "Proposed Baseline DVB-CPCM" Digital Video Broadcasting, Sep. 29, 2001.

Partial European Search Report dated Feb. 8, 2011, in counterpart application No. 06127119.3.

Chinese Office Action issued May 6, 2011, in corresponding Chinese Application No. 200610156675.0.

\* cited by examiner

| | UCI | IMPORT | BIND TYPE | DOMAIN-BOUND UR |
|---|---|---|---|---|
| C C I | COPY FREE | O | DEVICE, DOMAIN | ALL |
| | COPY ONCE | O | DEVICE | M,S,P |
| | COPY NO MORE | N/A | - | - |
| | COPY NEVER | X | - | - |
| B F | ON | O | DEVICE, DOMAIN | ALL |
| | OFF | X | - | - |

METHOD AND APPARATUS FOR IMPORTING CONTENT

CROSS-REFERENCE TO RELATED PATENT APPLICATIONS

This application claims the benefit of U.S. Provisional Patent Application No. 60/755,096, filed on Jan. 3, 2006, in the U.S. Patent and Trademark Office, and Korean Patent Application No. 10-2006-0021838, filed on Mar. 8, 2006, in the Korean Intellectual Property Office, the disclosures of which are incorporated herein in their entirety by reference.

BACKGROUND OF THE INVENTION

1. Field of the Invention

The present invention relates to digital content protection, and more particularly, to protection of digital content in a digital rights management (DRM) system.

2. Description of the Related Art

As the world is moving from the analogue age to the digital age, more content is being created in digitized forms. While copying of analogue content requires much time and effort, digital content can be copied easily and quickly.

Also, while the quality of the analogue content is degraded in proportion to the frequency of copying, quality of the digital content is identically maintained regardless of the frequency of copying. Accordingly, protection of digital content has been desired and a variety of research projects for protection of digital content have been conducted by many companies.

Figure 1:
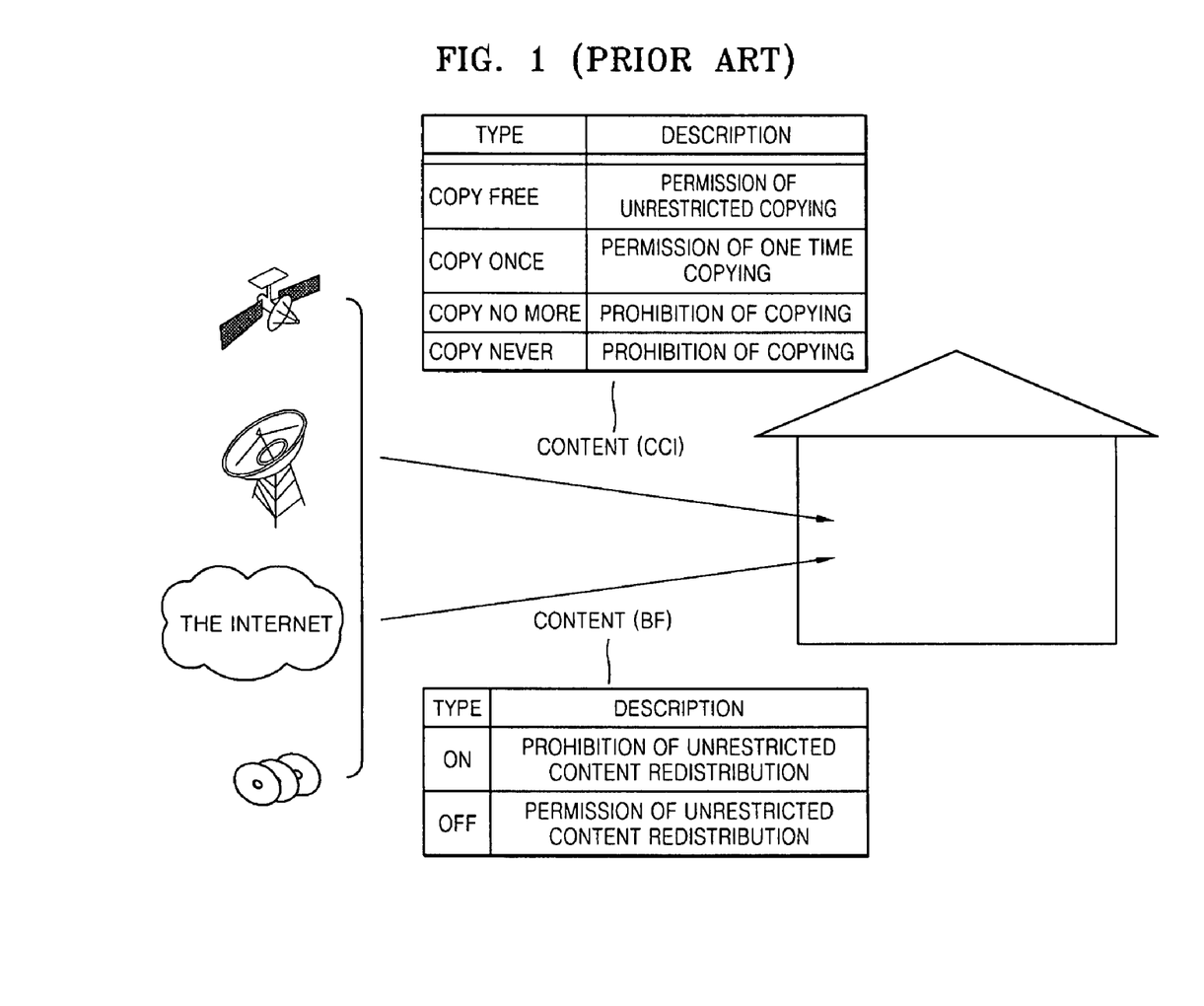
FIG. 1 illustrates a conventional digital content protection environment.

FIG. 1 illustrates a conventional digital content protection environment.

Referring to FIG. 1, in the conventional digital content protection environment, a transmission stream is received through a variety of transmission channels and digital content is designed to be protected by using information included in the transmission stream.

In particular, a U.S. organization, Cable Television Laboratories, Inc. (CableLabs), ordered that copy control information (CCI) be attached to digital content in order to control copying of the content. The CCI is 2-bit information which restricts the number of times of digital content may be copied. The types of CCI includes copy free (00), copy once (01), copy no more (10) and copy never (11). Copy free indicates that copying the content is permitted without restriction. Copy once indicates that only one copy is permitted. If content with the CCI of copy once (01) is copied, the CCI of this content then becomes copy no more (10). Copy never indicates a prohibition on copying the content.

In order to prohibit unrestricted redistribution of high definition (HD)-level digital content broadcast in the U.S., the U.S. Federal Communications Commission (FCC) has ordered that a broadcast flag should be attached to digital content. The broadcast flag is 1-bit information indicating whether or not unrestricted redistribution of digital content is prohibited. The types of broadcast flag includes broadcast flag on (1) and broadcast flag off (0). Broadcast flag on indicates that unrestricted redistribution of digital content is not permitted, while broadcast flag off indicates that unrestricted redistribution of the digital content is permitted.

However, since the conventional methods of protecting digital content, such as the CCI and the broadcast flag, are very simple and limited in their options, it is difficult to protect digital content while also satisfying the needs of content consumers for freer usage of content. In addition, with only the conventional methods of the CCI and the broadcast flag, it is difficult to limit use to authorized users when the content is being distributed. Also, these methods are not effective to prevent content from being illegally redistributed to or used by many and unspecified persons.

SUMMARY OF THE INVENTION

The present invention provides an apparatus and method capable of protecting digital content while responding to the needs of users for freer use of the content, allowing only authorized users to use the content, and preventing the content from being illegally redistributed to or used by many and unspecified persons.

The present invention also provides a computer readable recording medium having embodied thereon a computer program for executing the method in a computer system.

According to an aspect of the present invention, there is provided a method of importing a first content file into a second content file, the method including: determining a usage rule for content included in the first content file based on usage constraint information included in the first content file; and generating the second content file complying with the determined usage rule.

According to another aspect of the present invention, there is provided an apparatus of importing a first content file into a second content file, the apparatus including: a usage rule determination unit which determines a usage rule for content included in the first content file based on usage constraint information included in the first content file; and a content file generation unit which generates a second content file complying with the determined usage rule.

According to still another aspect of the present invention, there is provided a computer readable recording medium having embodied thereon a computer program for executing the import method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
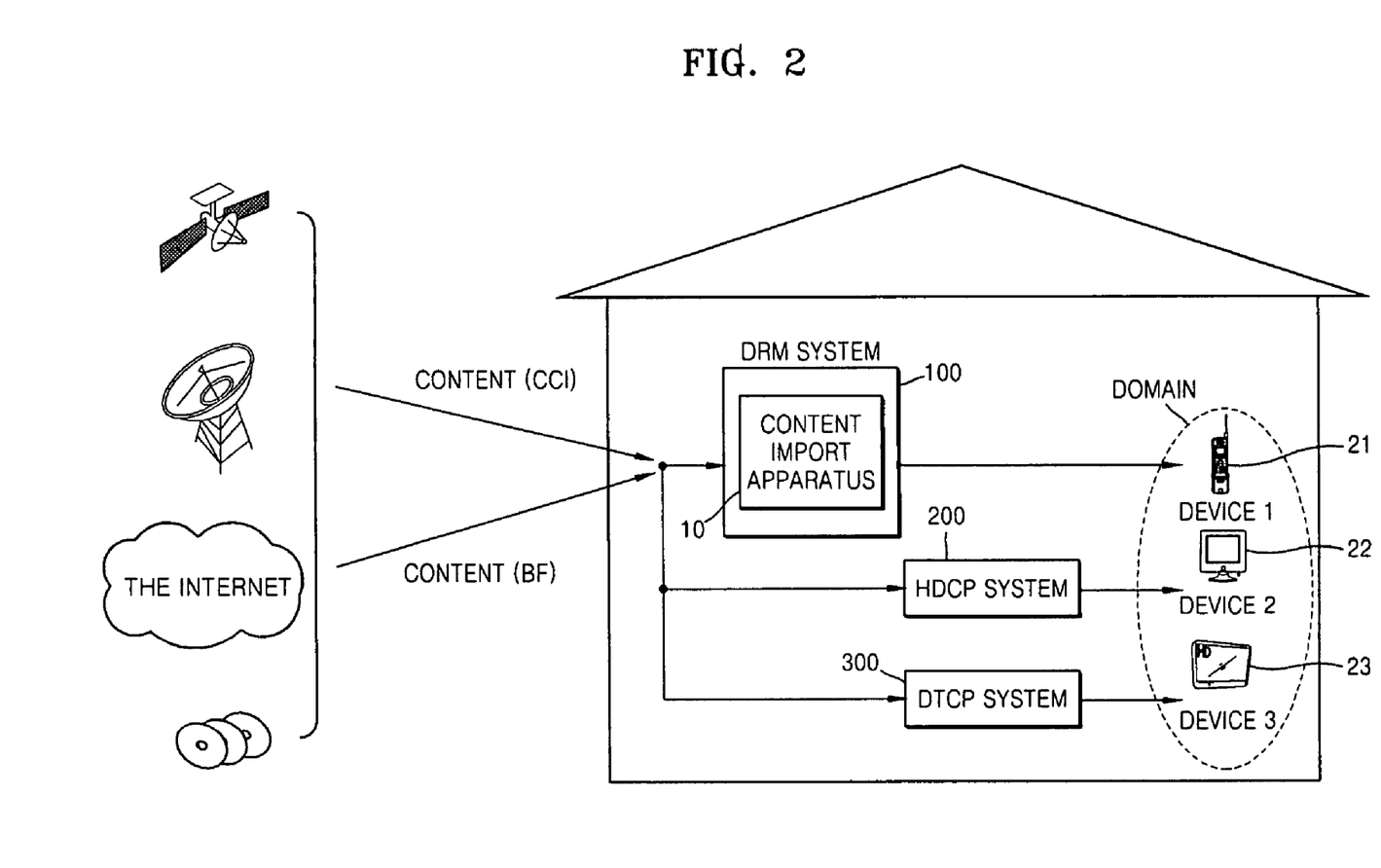
FIG. 2 illustrates a digital content protection environment according to an embodiment of the present invention.

FIG. 2 illustrates a digital content protection environment according to an embodiment of the present invention.

Referring to FIG. 2, the digital content protection environment according to the embodiment of the present invention is composed of a variety of content protection systems, such as a digital rights management (DRM) system 100, a high bandwidth digital content protection (HDCP) system 200, and a digital transmission content protection (DTCP) system 300, and a plurality of devices 21 through 23 protected by these content protection systems.

The DRM system 100 is a system for managing the rights of content received from the outside. The HDCP system 200 is a system for preventing copying of digital content output to a digital display through a high bandwidth interface, such as a digital video interface (DVI). The DTCP system 300 is a system for preventing copying of digital content transmitted through a universal serial bus (USB) complying with Institute of Electrical and Electronics Engineers (IEEE) 1394 standard. In addition to these content protection systems, other content protection systems such as a conditional access system (CAS), and content protection for recordable media (CPRM) system, may be further included, which can be easily understood by a person skilled in the art of the present embodiment.

In particular, according to the present embodiment, the DRM system 100 includes a content import apparatus 10 which imports digital content, which is protected by the conventional methods of copy control and the broadcast flag, as digital content complying with a rule of the DRM system 100 designed so that the rule can satisfy the security requirements of content creators and content providers and at the same time can satisfy the requirement of content consumers for free usage of content.

The importing of content in the present embodiment is defined as a process that a license for content is issued and the content is encrypted according to the rule of the DRM system 100. That is, in the present embodiment, the importing of content is a process of converting a content file not complying with the rule of the DRM system 100 into a content file complying with the rule of the DRM system 100. In the present embodiment, the content file is a file including digital content, and copy control information or a license for the content. In particular, a person skilled in the art of the present embodiment will understand that the term, 'a content file', can also be simply called 'content'.

Figure 3:
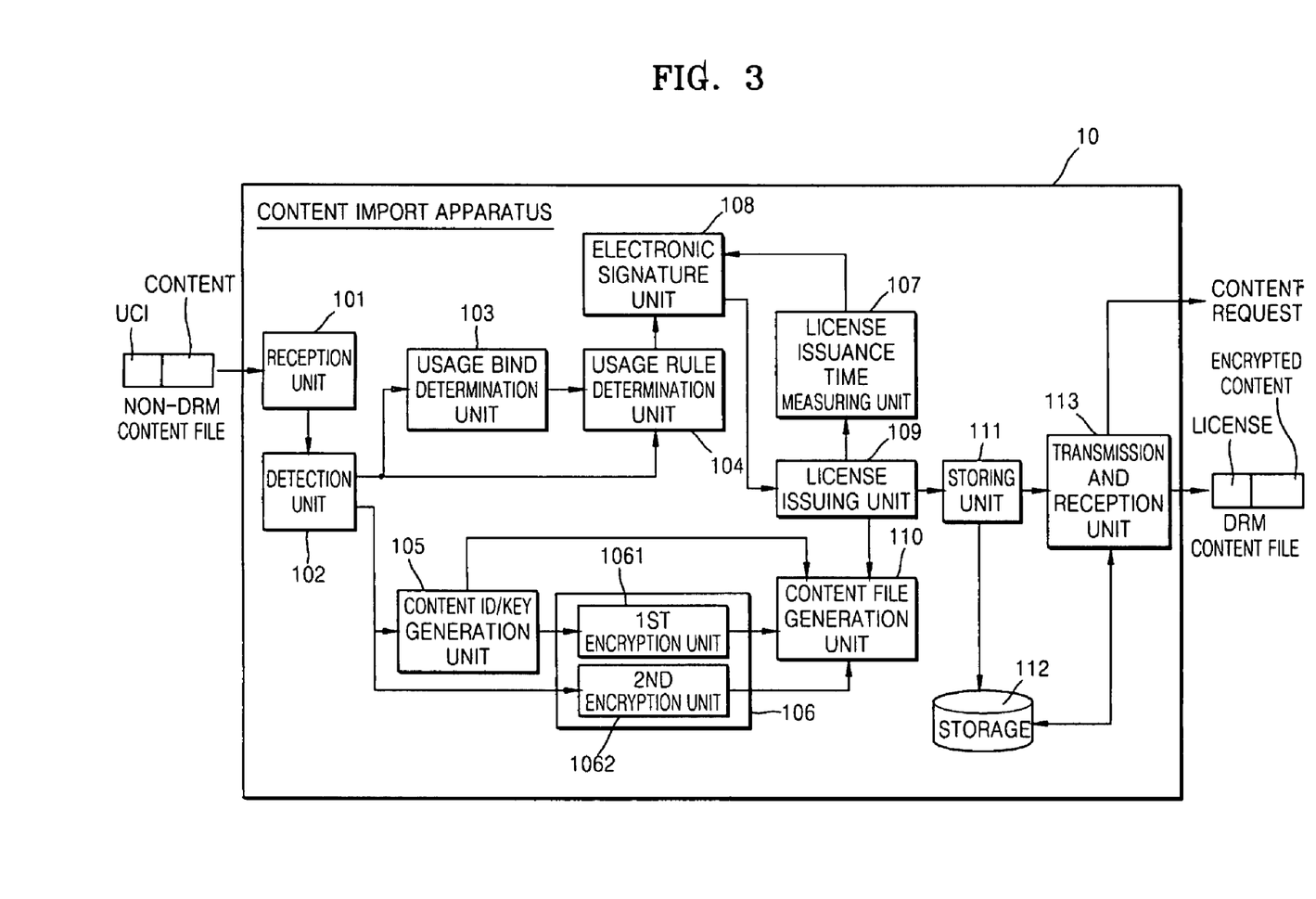
FIG. 3 illustrates a structure of a content import apparatus according to an embodiment of the present invention.

FIG. 3 illustrates a structure of a content import apparatus according to an embodiment of the present invention.

Referring to FIG. 3, the content import apparatus 10 illustrated in FIG. 2 is composed of a reception unit 101, a detection unit 102, a usage bind (usage category or scope) determination unit 103, a usage rule determination unit 104, a content ID/key generation unit 105, an encryption unit 106, a first encryption unit 1061, a second encryption unit 1062, a license issuance time measuring unit 107, an electronic signature unit 108, a license issuance unit 109, a content file generation unit 110, a storing unit 111, a storage 112 and a transmission and reception unit 113.

The reception unit 101 receives a transmission stream through a variety of transmission channels. For example, the reception unit 101 may receive a transmission stream through a wireless medium such as a satellite and a ground base station, or through a wired medium such as the Internet, or through a recording medium such as a digital versatile disk (DVD).

The detection unit 102 detects any one content file from the transmission stream received by the reception unit 101, and detects any one digital content and usage constraint information (UCI) of this content from the content file. The content file detected by the detection unit 102 does not comply with the rule of the DRM system 100 and includes the conventional copy control information or broadcast flag. As illustrated in FIG. 2, the content included in this content file may be protected by the DRM system 100 or may be protected by the conventional HDCP system 200 or DTCP system 300. However, in order to protect the content included in this content file by the DRM system 100, the content file detected by the detection unit 102 should be imported as a content file complying with the rule of the DRM system 100.

Examples of the UCI may include conventional copy control information and the broadcast flag. As described above, the copy control information is information which restricts the number of times of copying of digital content. The types of copy control information include copy free, copy once, copy no more and copy never. Also, the broadcast flag is information indicating whether or not unrestricted redistribution of the content is prohibited. The types of broadcast flag include broadcast flag on and broadcast flag off.

However, since copy no more is copy control information occurring when digital content has been copied once, the DRM system 100 cannot receive digital content with the copy control information of copy no more, and as a result, a case where the DRM system 100 imports content with copy no more cannot occur. This is because the DRM system 100 is a content protection system which receives for the first time a transmission stream through a variety of transmission channels as illustrated in FIG. 2, and a case where the DRM system 100 receives content with the copy control information of copy no more should not occur. Also, since copy never indicates prohibition of copying content, the DRM system 100 cannot copy content with the copy control information of copy never, and as a result, cannot import content with copy never. This is because in order to import any one digital content, the DRM system 100 should copy the content included in a content file which does not comply with the rule of the DRM system 100 and include the copied content in a content file which complies with the rule of the DRM system 100.

Also, if the broadcast flag of the content is broadcast flag off, unrestricted redistribution of the content is permitted and protection of the content by the DRM system 100 is not needed. Accordingly, the DRM system 100 does not need to import the content with broadcast flag off. That is, according to the present embodiment, there is no case where the content import apparatus 100 imports content with the copy control information of copy no more or copy never, or content with the broadcast flag of broadcast flag off. Accordingly, a case where the copy control information of content is copy no more or copy never, or the broadcast flag of content is broadcast flag off will be excluded in the following description of the present invention.

The usage bind determination unit 103 determines a usage bind of the content detected by the detection unit 102 based on the UCI detected by the detection unit 102 according to the rule of the DRM system 100. A "usage bind" as used herein, essentially corresponds to a defined usage category or scope. Considered herein are two categories, the first wherein usage is confined to a particular device, which will be referred to as a "device bound", and a second where usage is confined to a particular domain which may include a variety of devices, which will be referred to as a "domain bound". This will now be explained with an example in which the UCI detected by the detection unit 102 is copy control information. That is, if the copy control information detected by the detection unit 102 is copy free, the usage bind determination unit 103 determines the usage bind of the content to be a device-bound, which limits the usage of content to any one device, or a domain-bound which limits the usage of the content to all devices included in any one domain. Also, if the copy control information detected by the detection unit 102 is copy once, the usage bind determination unit 103 determines the usage bind of the content to be a device-bound according to the rule of the DRM system 100.

Since copy free indicates that unrestricted copying of content is permitted, the usage bind may be either a device-bound or a domain-bound, as described in more detail hereafter.

However, since copy once indicates that only one time copying of the content is permitted, the usage bind can only be a device-bound. This is because if the usage bind of the content is determined as a domain-bound, free copying of the content among devices included in the domain should be permitted.

Next, an example in which the UCI detected by the detection unit 102 is the broadcast flag will now be explained. That is, if the broadcast flag detected by the detection unit 102 is broadcast flag on, the usage bind determination unit 103 determines the usage bind of the content to be a device-bound or a domain-bound according to the rule of the DRM system 100. If the broadcast flag is broadcast flag on, this indicates that unrestricted redistribution of the content is not permitted, thus the usage bind may be a device-bound or a domain-bound. This is because the usage of the content within a device-bound complies with the prohibition of unrestricted redistribution of the content, and since a domain-bound is a specified area that can be recognized by a user, the usage of the content within the domain-bound also complies with the prohibition of unrestricted redistribution of the content.

Generally, since which domain is composed of which devices is preset by a user, a domain-bound can also be expressed as a user-bound. Also, as described above, since the rule of the DRM system 100 is determined in the direction that the rule can satisfy the security requirement of content creators and content providers and at the same time can satisfy the requirement of content consumers for free usage of content, the usage bind determination unit 103 determines the usage bind of the content as a device-bound or a domain-bound in this direction, i.e., in a balanced manner. Thus device-bound is determined only when determining that domain-bound violates the UCI, because the content usage right of a user can be so restricted.

The usage rule determination unit 104 determines a usage rule for the content detected by the detection unit 102 based on the UCI detected by the detection unit 102 according to the rule of the DRM system 100. More specifically, the usage rule determination unit 104 determines a usage rule of the content with respect to each usage bind determined by the usage bind determination unit 103. If the usage bind determined by the usage bind determination unit 103 is a device-bound, the usage rule determination unit 104 determines a usage rule of the content in any one device. If the usage bind determined by the usage bind determination unit 103 is a domain-bound, the usage rule determination unit 104 determines a usage rule of the content in any one domain.

Figure 4:
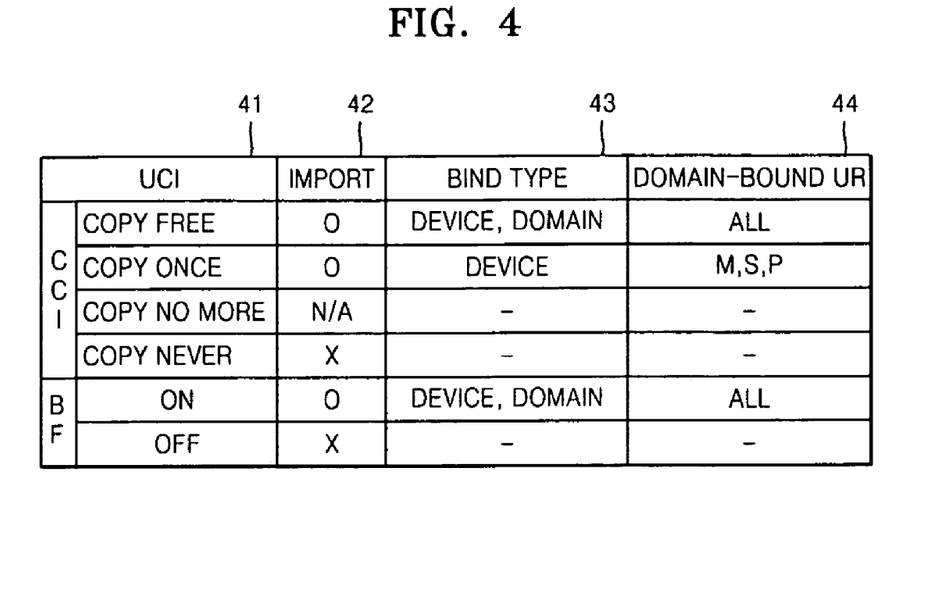
FIG. 4 illustrates a UCI/UR mapping table according to an embodiment of the present invention.

FIG. 4 illustrates a UCI/UR mapping table according to an embodiment of the present invention.

Referring to FIG. 4, the UCI/UR mapping table according to the embodiment of the present invention is composed of a UCI field 41, an import field 42, a bind type field 43, and a usage rule field 44.

UCI is recorded in the UCI field 41. In the import field 42, a value indicating whether or not the content having the UCI recorded in the UCI field 41 can be imported is recorded. In the bind type field 43, a usage bind based on the UCI recorded in the UCI field is recorded. In the usage rule field 44, a usage rule based on the UCI recorded in the UCI field with respect to the usage bind recorded in the bind type field 43 is recorded.

In particular, among values recorded in the usage rule field 44, 'all' indicates that all types of usages of content are permitted. Also, among values recorded in the usage rule field 44, "M" indicates moving of content. Moving of the content means that the content stored in any one device is deleted the instant the content is stored in another device. Also, among values recorded in the usage rule field 44, "S" indicates streaming of content. The streaming of content means that the content stored in any one device is temporarily output to another device but the content is continuously stored in the original device. Also, among values recorded in the usage rule field 44, "P" indicates playing of the content. The playing of the content means that any one device plays the content.

Since copy free indicates that unrestricted copying of content is permitted, if the UCI is copy free, "device" and "domain" are recorded in the bind type field 43 and "all" is recorded in the usage rule field 44. Meanwhile, since copy once indicates that only one time copying of content is permitted, if the UCI is copy once, device is recorded in the bind type field 43 and "M, S, and P" are recorded in the usage rule field 44.

In addition to moving, streaming and playing, examples of using content includes copying content. The copying of content means that content imported according to the embodiment of the present invention is copied. However, in order for the content import apparatus 10 to import the content, copying of the content is required as a prerequisite and as a result, if the content imported according to the present embodiment is copied, the frequency of copying becomes twice.

Accordingly, though the content import apparatus 10 can import content with the UCI being copy once, the content import apparatus 10 cannot permit copying of the content imported according to the present embodiment. This is the reason why only "M, S, and P" are recorded in the usage rule field 44 when the UCI is copy once.

Since broadcast flag on indicates that unrestricted redistribution of content is not permitted, if the broadcast flag is broadcast flag on, "device" and "domain" are recorded in the bind type field 43 and "all" is recorded in the usage rule field 44.

Any type of usage in a device-bound, including copying of content, complies with the prohibition of unrestricted redistribution of the content, and since a domain-bound is a specified are that can be recognized by a user, any type of usage in the domain-bound including copying of the content, complies with the prohibition of unresticted redistribution of the content.

The content ID/key generation unit 105 generates the ID of content detected by the detection unit 102 according to the rule of the DRM system 100 and generates a content key corresponding to this content ID. The content key generated by the content ID/key generation unit 105 is used to encrypt the content detected in the detection unit 102.

The encryption unit 105 selectively encrypts the content detected by the detection unit 102 according to the rule of the DRM system 100 based on the UCI detected by the detection unit 102. That is, if the copy control information is copy no more, or copy never, or the broadcast flag is broadcast flag off, the content import apparatus 10 does not import the content, and therefore the encryption unit 106 does not encrypt the content detected by the detection unit 102. The encryption unit 106 is composed of the first encryption unit 1061 for encrypting a content key and the second encryption unit 1062 for encrypting content.

The first encryption unit 1061 encrypts the content key generated by the content ID/key generation unit 105 with an encryption key corresponding to a usage bind determined by the usage bind determination unit 103. If the usage bind determined by the usage bind determination unit 103 is a device-bound, the first encryption unit 1061 encrypts the content key with an encryption key (hereinafter referred to as a "device key") corresponding to any one device. If the usage bind determined by the usage bind determination unit 103 is a domain-bound, the first encryption unit 1061 encrypts the content key with an encryption key (hereinafter referred to as a "domain key") corresponding to any one domain.

Accordingly, among devices which receive the content imported by the content import apparatus 10, only a device having a device key or domain key used to encrypt the content keys can decrypt the content keys encrypted by the first encryption unit 1061. Through this encryption process, only users authorized for the content can be selectively allowed to use the content and the danger of the content being illegally redistributed or used by many and unspecified persons can be effectively prevented.

For example, in order to allow only a device or domain selected by a user to obtain a content key, the first encryption unit 1061 only needs to encrypt the content key with a device key corresponding to a device selected by the user or with a domain key corresponding to a domain selected by the user. However, the first encryption unit 1061 should know which device corresponds to which encryption key, and information on this relation can be obtained from a server, such as a domain administrator (not shown).

The second encryption unit 1062 encrypts the content detected by the detection unit 102 with the content key generated by the content ID/key generation unit 105.

If the encryption by the first encryption unit 1061 is finished and the preparations for issuing a license for the content are complete, the license issuance time measuring unit 107 measures a time to issue a license. By inserting the thus measured license issuance time into the license, it can be made that only a device authorized device at the time when this license is issued, among devices receiving the content imported by the content import apparatus 10, can use the content. However, if the license issuance time is faked, the security requirement of content creators and content providers cannot be satisfied and as a result, the content protection function of the DRM system 100 cannot operate correctly. Accordingly, a secure time that cannot be manipulated arbitrarily should be used for the license issuance time.

The electronic signature unit 108 electronically signs the usage rule determined by the usage rule determination unit 104 and the license issuance time measured by the license issuance time measuring unit 107 according to the rule of the DRM system 100. Generally, an electronic signature is used to guarantee that a document or message is not falsified. If the usage rule determined by the usage rule determination unit 104 and the license issuance time measured by the license issuance time measuring unit 107 are falsified, the security requirement of content creators and content providers cannot be satisfied and as a result, the content protection function of the DRM system 100 cannot operate correctly.

The license issuance unit 109 generates and issues a license including the content ID generated by the content ID/key generation unit 105, the content key encrypted by the first encryption unit 1061, and the usage rule and license issuance time electronically signed by the electronic signature unit 108. More specifically, the license issuance unit 109 generates and issues the license including the usage rule determined by the usage rule determination unit 104 with respect to the usage bind determined by the usage bind determination unit 103. If the usage bind determined by the usage bind determination unit 103 is a device-bound, the license issuance unit 109 generates and issues a license for any one device. In particular, in this case, the license issuance unit 109 may issue a license including license status information to control usage of the content by a device which receives the content imported by the content import apparatus 10. Here, the license status information indicates whether or not the content can be used by the device. The license status information is set by the content import apparatus 10 or the device which receives the content imported by the content import apparatus 10.

If the usage bind determined by the usage bind determination unit 103 is a domain-bound, the license issuance unit 109 generates and issues a license for any one domain.

Figure 5:
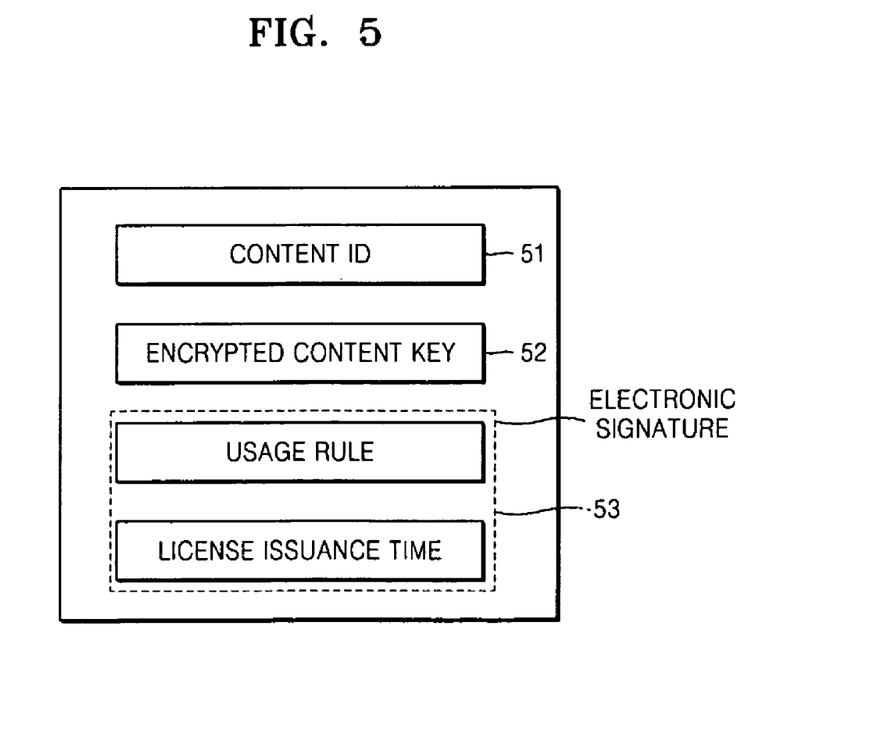
FIG. 5 illustrates a format of a license according to an embodiment of the present invention.

FIG. 5 illustrates a format of a license according to an embodiment of the present invention.

Referring to FIG. 5, the license according to the present embodiment is composed of a content ID 51, an encrypted content key 52, an electronically signed usage rule and license issuance time 53.

A device which receives the content imported by the content import apparatus 10 can identify the content imported by the content import apparatus 10 by referring to the content ID 51 of the license illustrated in FIG. 5. Also, in order to obtain the thus identified content, the device which receives the content imported by the content import apparatus 10 attempts to decrypt the encrypted content key 52 of the license illustrated in FIG. 5. As described above, among devices receiving the content imported by the content import apparatus 10, only a device having the device key or domain key used to encrypt the content key can decrypt the encrypted content key 52. Also, the device receiving the content imported by the content import apparatus 10 decrypts the content with the key restored through decryption. This is because the content imported by the content import apparatus 10 is in an encrypted form as described above.

Also, the device receiving the content imported by the content import apparatus 10 confirms whether or not the electronically signed usage rule and license issuance time 53 of the license illustrated in FIG. 5 is falsified and, based on the usage rule and license issuance time 53, confirms whether or not the user is authorized for the content. As a result, if it is confirmed that the electronically signal usage rule 53 is not falsified and the user is authorized for the content, the device receiving the content imported by the content import apparatus 10 uses the content according to the usage rule included in the license illustrated in FIG. 5. Accordingly, the security requirement of content creators and content providers can be satisfied and at the same time the requirement of content consumers for free usage of the content can be satisfied sufficiently.

The content file generation unit 110 generates a content file complying with the usage rule determined by the usage rule determination unit 104 according to the rule of the DRM system 100. This is to allow the device receiving the content imported by the content import apparatus 10 to use the content complying with the usage rule determined by the usage rule determination unit 104. As described above, the usage rule determined by the usage rule determination unit 104 is inserted into the license issued by the license issuance unit 109. That is, the content file generation unit 110 generates a content file including the license issued by the license issuance unit 109 and the content encrypted by the second encryption unit 1062. However, the license issued by the license issuance unit 109 and the content encrypted by the second encryption unit 1062 may be packaged as one unit or as separate units.

The storing unit 111 stores the content file generated by the content file generation unit 110 in the storage 112.

If a request from any one of the devices 21 through 23 illustrated in FIG. 2 to transmit the content to the device is received, the transmission and reception unit 113 transmits the content file stored in the storage 112 to this device. The transmission and reception unit 111 may transmit the content file according to an arbitrary method that the device supports. For example, the content may be transmitted through a storage medium, such as a secure digital (SD) card, or according to a transmission protocol, such as a real-time transport protocol (RTP).

Figure 6A:
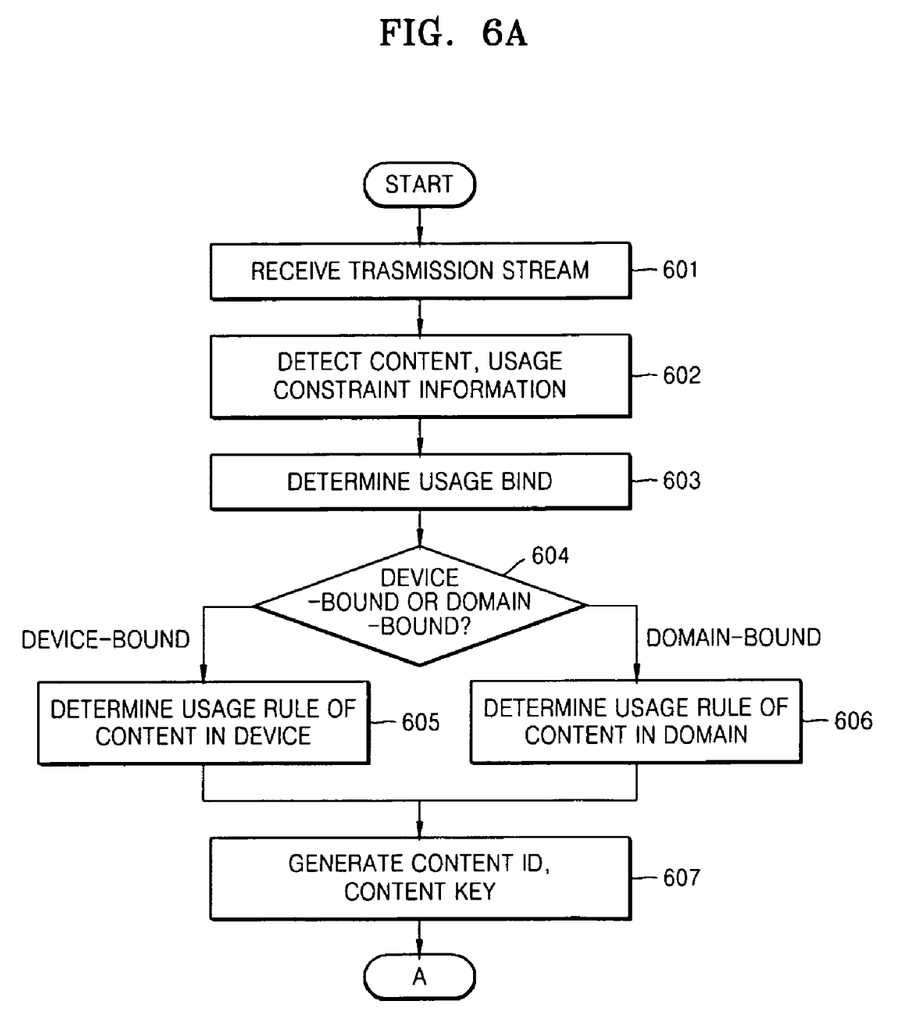
FIGS. 6A and 6B are flowcharts illustrating a content import method according to an embodiment of the present invention.
Figure 6B:
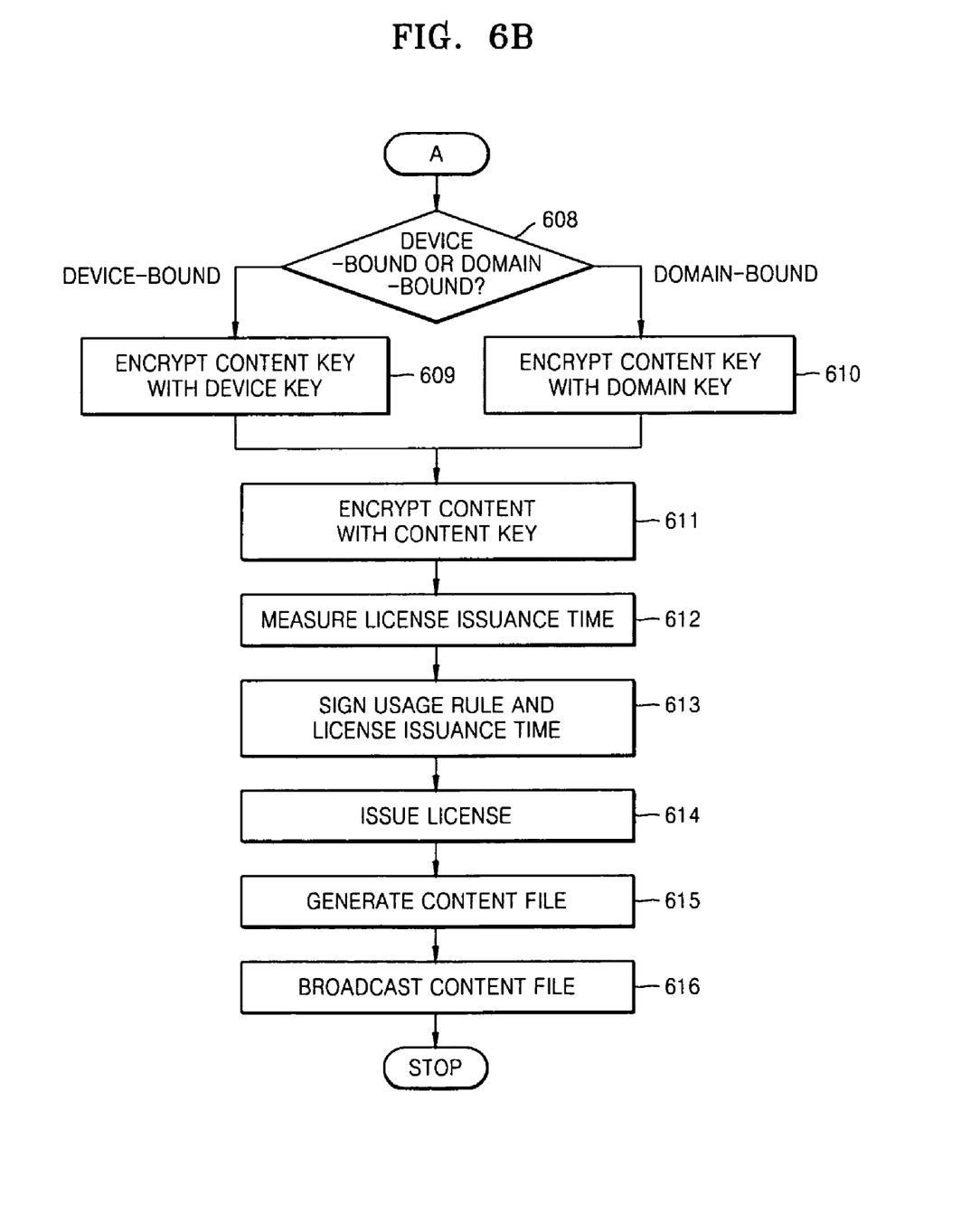

FIGS. 6A and 6B are flowcharts illustrating a content import method according to an embodiment of the present invention.

Referring to FIGS. 6A and 6B, the content import method according to the present embodiment is composed of operations processed in time series in the content import apparatus 10 illustrated in FIG. 3. Accordingly, the explanation made above in relation to the content import apparatus 10 illustrated in FIG. 3, though not repeated below, is also applied to the content import method according to the present embodiment.

In operation 601, the content import apparatus 10 receives a transmission stream through a variety of transmission channels.

In operation 602, the content import apparatus 10 detects any one content file from the transmission stream received in operation 601, and detects any one digital content and usage constraint information (UCI) with respect to this content from the content file.

In operation 603, the content import apparatus 10 determines the usage bind of the content detected in operation 602 based on the UCI detected in operation 602 according to the rule of the DRM system 100.

In operation 604, if the usage bind determined in operation 603 is a device-bound, the content import apparatus 10 performs operation 605 and if it is a domain-bound, the content import apparatus 10 performs operation 606.

In operation 605, the content import apparatus 10 determines the usage rule of the content in any one device based on the UCI detected in operation 602 according to the rule of the DRM system 100.

In operation 606, the content import apparatus 10 determines the usage rule of the content in any one domain based on the UCI detected in operation 602 according to the rule of the DRM system 100.

In operation 607, the content import apparatus 10 generates the ID of the content detected in operation 602 and generates a content key corresponding to this content ID according to the rule of the DRM system 100.

In operation 608, if the usage bind determined in operation 603 is the device-bound, the content import apparatus 10 performs operation 609 and if it is the domain-bound, the content import apparatus 10 performs operation 610.

In operation 609, the content import apparatus 10 encrypts the content key with a device key corresponding to any one device according to the rule of the DRM system 100.

In operation 610, the content import apparatus 10 encrypts the content key with a domain key corresponding to any one domain according to the rule of the DRM system 100.

In operation 611, the content import apparatus 10 encrypts the content detected in operation 602 with the content key generated in operation 607 based on the UCI detected in operation 602.

In operation 612, if the encryption in operation 609 or 610 is finished and preparation for issuing a license is finished, the content import apparatus 10 measures the time to issue a license.

In operation 613, the content import apparatus 10 electronically signs the usage rule determined in operation 605 or 606 and the license issuance time measured in operation 612 according to the rule of the DRM system 100.

In operation 614, according to the rule of the DRM system 100 the content import apparatus 10 generates and issues a license including the content ID generated in operation 607, the content key encrypted in operation 609 or 610, and the usage rule and license issuance time electronically signed in operation 613.

In operation 615, the content import apparatus 10 generates a content file complying with the usage rule determined in operation 605 or 606 according to the rule of the DRM system 100. That is, in operation 615, the content import apparatus 10 generates the content file including the license issued in operation 614 and the content encrypted in operation 611.

In operation 616, the content import apparatus 10 stores the content file generated in operation 615.

In operation 617, if a request from any one of the devices 21 through 23 illustrated in FIG. 2 to transmit the content to the device is received, the content import apparatus 10 performs operation 618.

In operation 618, the content import apparatus 10 transmits the content file stored in operation 616.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope of the claims will be construed as being included in the present invention.

According to the present invention, content which does not comply with the rule of a DRM system is imported as content complying with the rule of the DRM system. By doing so, the content can be protected while being responsive to the demand of users for free usage, and only users authorized for the content can be allowed to use the content. As a result, the danger of content being illegally redistributed or used by many and unspecified persons can be prevented.

In particular, according to the present invention, based on usage constraint information included in a content file received from the outside, for example, the copy control information and the broadcast flag, the usage rule of the content included in this content file is determined and a content file complying with this usage rule is generated. By doing so, in addition to the limited content protection by the conventional copying control and broadcast flag, the security requirement of content creators and content providers can be satisfied and at the same time the requirement of content consumers for free usage can be satisfied sufficiently.

What is claimed is:

1. A method of importing a first content file into a second content file, the method comprising:

determining a usage rule for content included in the first content file based on usage constraint information included in the first content file;

generating the second content file complying with the determined usage rule; and determining the usage bind of the content based on the information, wherein in the determining of the usage rule, the usage rule is determined with respect to each determined usage bind, wherein in the determining of the usage bind of the content, the usage bind of the content is determined to be a device-bound that limits the usage to any one device or a domain-bound that limits the usage to all devices included in any one domain, and in the determining of the usage rule, if the usage bind is determined to be a device-bound, the usage rule of the content in any one device is determined, and if the usage bind is determined to be a domain-bound, the usage rule of the content in any one domain is determined.

2. A method of importing a first content file into a second content file, the method comprising:

determining a usage rule for content included in the first content file based on usage constraint information included in the first content file;

generating the second content file complying with the determined usage rule;

determining the usage bind of the content based on the information, wherein in the determining of the usage rule, the usage rule is determined with respect to each determined usage bind, and wherein the usage bind of the content is determined to be a device-bound that limits the usage to any one device or a domain-bound that limits the usage to all devices included in any one domain;

encrypting a content key with an encryption key corresponding to the determined usage bind; and encrypting the content with the content key, wherein in the generating of the second content file, the content file including the usage rule, the encrypted content key and the encrypted content is generated.

3. An apparatus for importing a first content file as a second content file, the apparatus comprising:

a usage rule determination device which determines a usage rule for content included in the first content file based on usage constraint information included in the first content file;

a content file generation device which generates the second content file complying with the determined usage rule; and an encryption device which selectively encrypts the content based on the information, wherein the content file generation device generates the second content file including the usage rule and the encrypted content.

4. A method of importing content comprising:

receiving at a computer implementing a digital rights management (DRM) system a content file which includes usage constraint information and does not comply with a digital rights management (DRM) usage rule for the DRM system;

determining a usage bind based on the DRM usage rule for the DRM system;

assigning an identification (ID) of the content;

generating a content key corresponding to the ID and based at least in part on the usage bind;

generating a license including DRM usage rule information determined by usage constraint information of the content; and encrypting the content with the content key.

5. The method of claim 4, wherein the license further comprises information on a time when the license is issued.

6. A method of importing content in a device-bound, the method comprising:

receiving at a digital rights management (DRM) system a content file which includes usage constraint information and does not comply with a digital rights management (DRM) usage rule for the DRM system;

determining the device-bound based on the DRM usage rule for DRM system;

assigning an ID of the content;

generating a content key corresponding to the ID;

generating a license including DRM usage rule information determined by usage constraint information of the content;

encrypting the content with the content key; and setting a license status to use the content to an apparatus for importing the content.

7. A method of importing content in a device-bound, the method comprising:

receiving with a digital rights management (DRM) system a content file which includes usage constraint information and does not comply with a digital rights management (DRM) usage rule for the DRM system;

determining the device-bound based on the DRM usage rule determined by the DRM system;

assigning an ID of the content;

generating a content key corresponding to the ID;

generating a license including DRM usage rule information determined by usage constraint information of the content;

encrypting the content with the content key; and setting a license status to use the content to a device which receives the generated license and the encrypted content.

8. A method of importing content in a domain-bound, the method comprising:

receiving at a computer implementing a digital rights management (DRM) system a content file which includes usage constraint information and does not comply with a digital rights management (DRM) usage rule for the DRM system;

determining the domain-bound based on the DRM usage rule determined by the DRM system;

assigning an ID of the content;

generating a content key corresponding to the ID;

generating a license including DRM usage rule information determined by usage constraint information of the content;

encrypting the content with the content key;

receiving a domain key of the domain; and encrypting the content key with the domain key.

* * * * *